United States Patent
Smith et al.

(10) Patent No.: US 6,175,845 B1
(45) Date of Patent: Jan. 16, 2001

(54) METHOD AND COMPONENT FOR PRESENTATION OF INFORMATION

(75) Inventors: Andrew John Smith, Warwick; David Seager Renshaw, Winchester, both of (GB)

(73) Assignee: International Business Machines Corporation, Armonk, NY (US)

( * ) Notice: Under 35 U.S.C. 154(b), the term of this patent shall be extended for 0 days.

(21) Appl. No.: 09/087,778

(22) Filed: May 29, 1998

(30) Foreign Application Priority Data

Jan. 6, 1998 (GB) .................................................. 9800100

(51) Int. Cl.[7] .................................................. G06F 17/21
(52) U.S. Cl. ........................................... 707/525; 707/521
(58) Field of Search .................................... 707/525, 522, 707/517, 515, 521, 530, 531, 529, 520

(56) References Cited

U.S. PATENT DOCUMENTS

| | | | |
|---|---|---|---|
| 4,709,348 | * 11/1987 | Horn et al. ............................. | 345/511 |
| 4,723,209 | * 2/1988 | Hernandez et al. ............. | 707/525 X |
| 4,951,233 | * 8/1990 | Fujiwara et al. ..................... | 707/525 |
| 4,998,832 | * 3/1991 | Okimoto et al. ..................... | 707/525 |
| 5,140,676 | * 8/1992 | Langelaan .............................. | 400/76 |
| 5,208,905 | * 5/1993 | Takakura et al. .................... | 707/515 |
| 5,278,952 | * 1/1994 | Kira et al. ............................. | 707/515 |
| 5,623,681 | * 4/1997 | Rivette et al. ........................ | 707/522 |
| 5,784,487 | * 7/1998 | Cooperman .......................... | 382/175 |
| 5,911,146 | * 6/1999 | Johari et al. .......................... | 707/525 |

OTHER PUBLICATIONS

Somogyi, "Inside Acrobat Amber: more than PostScript on the Web", Digital Media, v5, n7–8, p. 15(4), ISSN: 1056–7038, Dec. 1995.*

Gruman, "QuarkXPress versus PageMaker", MacWorld, v14, n12, p. 86(7), ISSN: 0741–8647, Dec. 1997.*

Sellers, "UniQorn 1.0 puts new twists on DTP with good GX tools", MacWeek, v10, n18, p. 37(2), ISSN: 0892–8118, May 1996.*

Tribute et al, "Dainippon Screen: venerable company heads in a new direction", Seybold Report on Publishing Systems, v22, n14, p. 3(12), ISSN: 0736–7260, May 1993.*

* cited by examiner

*Primary Examiner*—Joseph H. Feild
(74) *Attorney, Agent, or Firm*—Scully, Scott, Murphy & Presser; Louis Herzberg

(57) ABSTRACT

A method of presenting information via a user interface of a computer system is disclosed. The method is executed by a book component and a renderer component. The book determines page boundaries for pages in which information is to be presented, and communicates the page boundaries to the renderer. The renderer determines a number of pages, constrained by the page boundaries, required to fully render the information, and communicates the number of pages to the book. Responsive to the book providing an input token representing a prominent element of information on a page, the renderer determines a page number for the page containing the element of information represented by the token, and communicates the page number to the book. Responsive to an event requiring the presentation of a page including a prominent element of information, the book communicates the page number to the renderer. The renderer presents the page in a display area and provides an output token to the book representing a prominent element of information on the presented page.

9 Claims, 4 Drawing Sheets

---

The Book Metaphor

Implementation of the book metaphor using Java and HTML makes the model a reality. Users have found the use of the book metaphor as an interface to many computer applications a more natural way to interact with computers in order to access various forms of information.

A simple example of a book rendering HTML content has been used to show the advantages of such interfaces and to explore various aspects of the user experience.

Rendering Information

The date only a limited range of content types have been used in the experiments but the framework of the interface has been designed to allow the addition of new content type renderers to be easily added.                  ------logical page break
1

The book associates a render object with each with each displayed page. The containing book book co-ordinates with each renderer.

The user may scroll through the information using more natural and intuitive mechanism such as turning a page or selecting a page edge tab.

an image of a book

Users are able to learn to use applications using a book interface more quickly and with less tuition.

FIG. 2

```
<html>
<head>
<title>Example HTML text for book metaphor rendition</title>
</head>
<body>
<h1>The Book Metaphor</h1>
<p>
Implementation of the book metaphor using Java and HTML makes the model
a reality. Users have found the use of the book metaphor as an interface
to many computer applications a more natural way to interact with
computers in order to access various forms of information.
<p>
A simple example of a book rendering HTML content has been used to show
the advantages of such interfaces and to explore various aspects of the
user experience.
<h2>Rendering Information</h2>
<p>
To date only a limited range of content types have been used in the
experiments but the framework of the interface has been designed to allow
the addition of new content type renderers to be easily added.
<p>
<img src=book_image.gif align=right>
The book assoiates a renderer object with each displayed page. The
containing
book co-ordinates with each renderer.
<p>
The user may scroll through the information using more natural and
intuitive mechanism such as turning a page or selecting a page edge tab.
Users are able to learn to use applications using a book interface
more quickly and with less tuition.
</body>
</html>
```

FIG. 3

The Book Metaphor

Implementation of the book metaphor using Java and HTML makes the model a reality. Users have found the use of the book metaphor as an interface to many computer applications a more natural way to interact with computers in order to access various forms of information.

A simple example of a book rendering HTML content has been used to show the advantages of such interfaces and to explore various aspects of the user experience.

------ logical page break 1

Rendering Information

To date only a limited range of content types have been used in the experiments but the framework of the interface has been designed to allow the addition of new content type renderers to be easily added.

The books associates a renderer object with each displayed page. The containing book co-ordinates with each renderer.

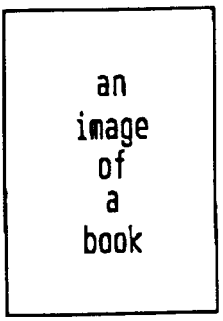

The user may scroll through the information using more natural and intuitive mechanism such as turning a page or selecting a page edge tab. Users are able to learn to use applications using a book interface more quickly and with less tuition.

------ logical page break 2

FIG. 4

The Book Metaphor

Implementation of the book metaphor using Java and HTML makes the model a reality. Users have found the use of the book metaphor as an interface to many computer applications a more natural way to interact with computers in order to access various forms of information.

A simple example of a book rendering HTML content has been used to show the advantages of such interfaces and to explore various aspects of the user experience.

Rendering Information

The date only a limited range of content types have been used in the experiments but the framework of the interface has been designed to allow the addition of new content type renderers to be easily added.         ------ logical page break
1

The book associates a render object with each with each displayed page. The containing book book co-ordinates with each renderer.

The user may scroll through the information using more natural and intuitive mechanism such as turning a page or selecting a page edge tab.

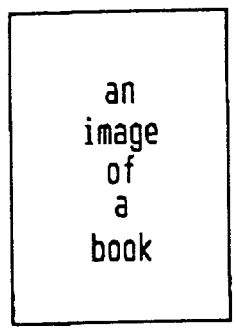

Users are able to learn to use applications using a book interface more quickly and with less tuition.

METHOD AND COMPONENT FOR PRESENTATION OF INFORMATION

FIELD OF THE INVENTION

The present invention relates to a method and component for presentation of information.

BACKGROUND OF THE INVENTION

Pagination of complex information is not a new concept. Word processors and report generators are just two examples where complex information is formatted to display or print over multiple pages. In existing embodiments, the formatting and display of information elements are managed by the same entity. Technologies such as JavaBeans and ActiveX facilitate the containment and arrangement of arbitrary content, but typically a container must define the containment area and implement the arrangement strategy. Complex containers that deal with multi-page presentation are possible, but may need to be extended or re-implemented to deal with new forms of content.

DISCLOSURE OF THE INVENTION

The invention provides a method of presenting information via a user interface of a computer system, the computer system comprising a book component and a renderer component, comprising the steps of: said book determining page boundaries for pages in which information is to be presented, and communicating said page boundaries to said renderer; said renderer determining a number of pages, constrained by said page boundaries, required to fully render said information, and communicating said number of pages to said book; responsive to said book providing an input token representing a prominent element of information on a page, said renderer determining a page number for the page containing the element of information represented by said token, and communicating said page number to said book; responsive to an event requiring the presentation of a page including a prominent element of information, said book communicating said page number to said renderer; and said renderer presenting said page in a display area.

BRIEF DESCRIPTION OF THE DRAWINGS

FIG. 2 is an example of HTML content to be rendered;

FIG. 3 shows a logical page layout of the HTML content of FIG. 2, rendered for an initial book page size; and FIG. 4 is a logical rendition of the HTML content of FIG. 2 for a resized book page.

DESCRIPTION OF THE PREFERRED EMBODIMENT

Figure 1:
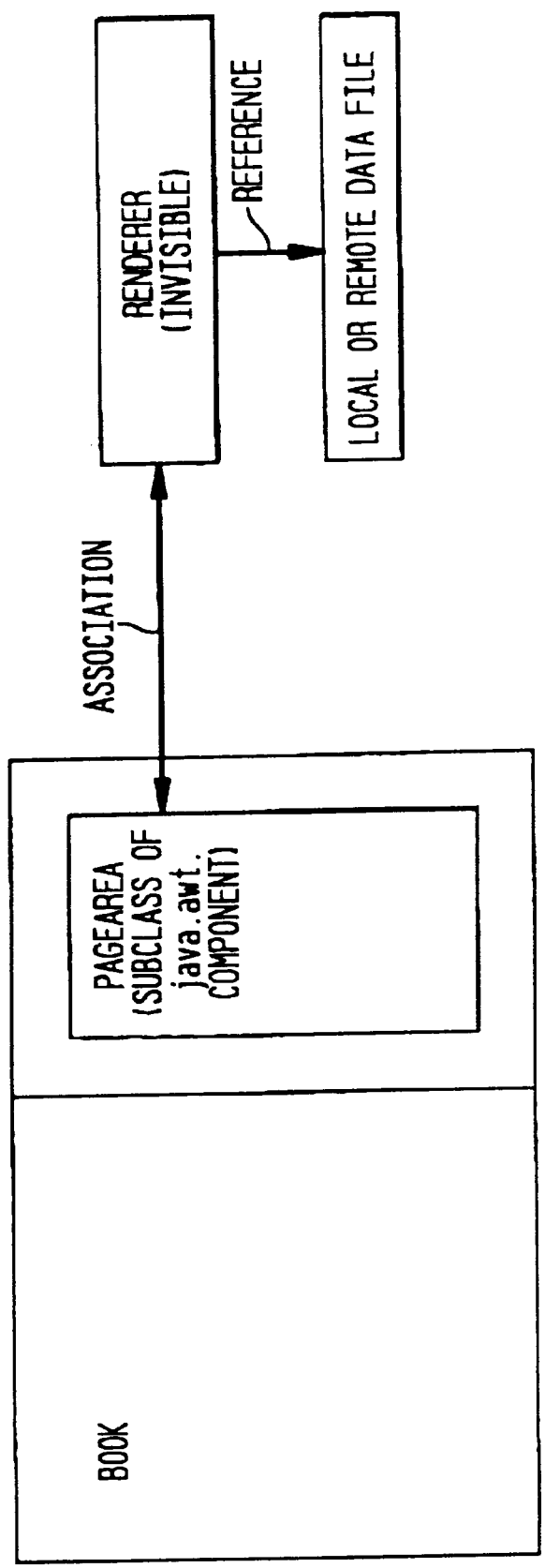
FIG. 1 illustrates the logical association of major components of a book.

In the present invention, a component that performs containment of information is referred to as a book, whereas a component that performs presentation of information is referred to as a renderer. The book has responsibility for definition of a page area, control of navigation between pages, and communication of which page to present to an associated but discrete renderer. The renderer has responsibility for formatting of information to fit the page, and presentation of the correct information for any given page on demand.

An embodiment of this invention has been implemented using the Java programming language. The contract between a book and a renderer is described using a Java interface definition. This interface definition is described first, followed by a brief description of how a book and a renderer fulfil their respective obligations.

Renderer Interface

Table 1 shows the Java interface definition whose methods are explained below.

setPageBounds ( ) and setMargins ( ) are called when a book first communicates with a renderer. Thereafter, setPageBounds ( ) is called whenever the book's page display area size is modified; and setMargins ( ) is called if a book's margin definitions are modified.

renderpage ( ) is called, providing a java.awt.Graphics object "g", and a page number "page" to render, whenever page presentation is required. renderPage ( ) returns a token representing a prominent element of information on the presented page. The token is stored by the book, replacing any previously returned token. The returned token may be used subsequently to obtain a new page number for the prominent element after reflowing has occurred. The Graphics class primarily provides an addressable area for the renderer which in turn is mapped onto an area of the screen. The Graphics class also exposes a number of methods for drawing primitives such as lines and circles etc, and these are used by a renderer that performs its own drawing. The renderer may alternatively use standard buttons or controls etc. to help render the content.

getpages ( ) returns the number of pages required to completely render the information content, taking into account the current page and margin sizes, getpage ( ), on the other hand, returns the page number of the page that contains the given content token. getpage ( ) is used to ensure that the same content is displayed after reflowing, caused by changing a page size or its margins. If the token is not found, zero is returned.

Both getpage and getPages are called whenever the book's page display area size or margin definitions are modified, thus allowing the book to maintain an appropriate navigational page number after the renderer has reflowed information content.

Book Implementation

The page area for display of content within a book is implemented by subclassing the standard java.awt.Component class provided with the Java Development Kit. java.awt.Component provides a mapping between software components and an area of the screen. The Java environment defines interfaces that may be implemented by java classes wishing to monitor instances of java.awt.Component for events such as resizing and other user interactions. The function of java.awt.Component may be extended by classes wishing to intercept requests by the environment to repaint areas of the component.

An extract from an example of such a class extending java.awt.Component, PageArea, is given in Table 2 and illustrated in FIG. 1. PageArea first of all instantiates a new renderer, in this case a HTMLRenderer. PageArea must then override the standard "paint" method for the component in order to call the renderers renderpage method. "paint" will be called by the system whenever the page is to be painted or repainted. The redefined paint method asks the renderer to render the current page contents by calling renderpage. A "layout" method is then defined and is called whenever the size of this component is changed due to book resizing etc.

Layout finds out which page the key item that was previously in view of the user is now on, by calling "getPage", and calls "repaint" which in turn calls the redefined paint method to render the page area at this page.

In the above example it is assumed that the book maintains a reference to the location of information to be presented, local file, URL, etc. and understands which implementation of the Renderer interface is appropriate to format and render that information, "HTMLRenderer". When a book wishes content to be displayed on its page area(s), an instance of the appropriate Renderer implementation is instantiated and a reference to the information location is passed to it. The renderer's setPageBounds ( ) method is then called to provide the current page display area dimensions. If a book has restrictive margins defined, then the renderer's setMargins ( ) method is also called. Following this, the renderer's getpages ( ) method is called and the returned number of pages stored. This allows the book to understand the limits of pagination for this particular renderer at the current page and margin sizes. Typically, the book then renders the first page of the content by requesting a repaint of the java.awt.Component which represents the page area. The paint ( ) method of the component representing the page area then calls the renderpage ( ) method of the renderer associated with the page, specifying a page number of one. The token returned is saved for later use.

When user interaction events, such as go to start/end of book or to a specified page, interpreted as page navigation requests by the book are received, the book determines the page number required by the user, and calls the renderer's renderpage ( ) method, passing the java.awt.Graphics object associated with the java.awt.Component object representing the page, to request that the required page of information be presented. The returned token is stored in place of any previously stored token. The book does not need to understand or interpret this token, it merely needs to store it for possible subsequent delivery to the renderer's getPage ( ) method.

When user interaction events interpreted as page size or margin definition modifications by the book are received, the book passes on the modified information to the renderer using its setPageBounds ( ) and/or setMargins ( ) methods. It then obtains the number of pages of the new size that the renderer would require to completely present all of its information using the renderer's getpages ( ) method. The book then requests, from the renderer, the page number of the page on which the information element represented by the last stored token would be rendered. This page number is used by the book to reset its internal page location. Finally, the book asks the renderer to render the information for the new current page.

Renderer Implementation

In a preferred embodiment the Renderer understands, and can format and present, HTML (hyper-text mark-up language) information. Such an implementation takes the reference to the information location provided by the book and reads the information. The information read is parsed according to the rules of the HTML specification to extract the information formatting clues provided by HTML tags. When the structure of the information has been ascertained the renderer builds formatting information, font size, type style, etc. to allow the information to be rendered in the space defined by the book via the Renderer interface setPageBounds ( ) and setMargins ( ) calls. In building the formatting information the renderer computes and stores details of the logical page boundaries. Using this page boundary information, the renderer is able to supply information when called via the getPages ( ) and getPage ( ) methods.

The renderer implementation, in parsing the HTML stream, must analyse the data in some detail. Account must be made for the varying types of content within the HTML stream i.e. images, Java applets, etc. and the text flow and alignment in order to assess the space required to render the content. In order to conform to a book model the renderer must position the various elements in order to maintain a consistent view avoiding incomplete images at the foot of a page for example.

To calculate the number of pages required to present an HTML stream, the renderer first logically renders the stream to a page of infinite length but whose boundaries are as defined by the setPageBounds ( ) and setMargins ( ) calls. To accomplish this, the implementation subdivides the available page space into rectangles which contain either a line of text, an image, an applet or some other HTML defined entity. The rectangles are laid out according to the alignment specification defined by the HTML stream with text flowing as required and/or specified. Having laid the data out the renderer can now subdivide the layout in order to create pages of the required length adjusting the layout to avoid page breaks within images etc. Having subdivided the layout the renderer now knows the total number of pages and the identity of the rectangular element at the top of each page. The renderer assigns a token value to the item at the top of each page which is passed to the book on a renderpage ( ) call.

The identifying token is passed by the book to the renderer on a getPage ( ) call to find out the numeric page number on which the item exists. This usually happens after the book has changed it's page shape characteristics (size or margins) and allows the book to request rendering of the page containing the item and thus avoid presenting the wrong information to the user after the page has been resized.

Consider the following example. The book requests the renderer to render page 6 of it's content, due to user pagination requests or some other interaction. The renderer renders the requested page and returns a token, identifying the content element at the top of page 6, a heading perhaps. The user of the book resizes it making the displayed page area larger. The book informs the renderer of the change of page format using a setPageBoundaries ( ) call causing the renderer to recalculate it's formatting data. The book then requests the number of the page that now contains the content item formerly at the top of page 6 using a getpage ( ) call specifying the previously returned token. The renderer uses the token to identify the content element, the heading, and returns the page number of the page it now resides on. The book then requests the renderer to render the returned page number thus ensuring the content the user was seeing before the resize is still visible.

The renderer need only parse the HTML information stream once but may have to compute the page boundary and formatting information multiple times. Whenever the book calls the setPageBoundaries ( ) or setMargins ( ) methods, indicating that the display area has changed size or characteristics, the formatting and boundary information must be recalculated.

Consider the example of HTML content shown in FIG. 2. The HTML is presented as a stream of data to an HTML renderer implementation running within a book. The book has a set page size and margins and thus the renderer parses the HTML stream and logically renders the HTML to a page of the correct width and of infinite length. Having completed this operation the renderer may now locate the logical page boundaries necessary to permit the content to be reasonably presented. The renderer now knows where each page begins and the total number of pages required to render the whole of the content.

The book requests the rendering of a particular page, for instance page 2, in response to some user interaction such as scrolling. In response the renderer returns a token which allows it to identify some piece of content on the page it has just rendered. In the example this token might identify the second level heading "Rendering Information", FIG. 3. The book does not need to understand the format of the content or what it identifies.

The first logical page break occurs just prior to the second level heading "Rendering Information", determined by the width of the page and any in-built rules of the renderer such as avoiding widowed headings.

If the user now resizes the book such that the page width is increased the book notifies it's page renderers. In response the renderers must again logically render the content to discover the layout of each page and the total number of pages. The book then presents the token it received earlier to the renderer via the getPage ( ) method to find out which page the content item represented by the token now exists on.

FIG. 4 shows the logical page layout for the new book page size and we can see the second level heading resides on page one. Thus the render returns "1" on the getpage ( ) request. The book then requests the renderer to render page 1 and thus the second level heading remains visible to the user even after the book has been resized.

The renderer may use any number of strategies for predicting what is the most notable and thus the item most expected by the user to remain in view. The simplest of these is simply to ensure the item at the top of the page is visible but one can envisage strategies that use images, figures, tables, headings, etc.

It will be seen that other renderer implementations can be provided to render and calculate pagination information for content in any number of formats, for example, ASCII, RTF, Postscript, Bookmaster script etc. Depending on the format of the data the renderer may provide more or less sophisticated mechanisms for determining the key element in view by the user. For simple data streams such as ASCII it may be just a particular word or line whereas for richer content types it may follow the example of the HTML implementation described here.

```
public interface Renderer {
    public void setPageBounds(Rectangle pageBounds);
    public void setMargins(int top, int bottom, int
left, int right);
    public int getPages();
    public int getPage(Object token);
    public Object renderPage(Graphics g, int page); }
```

TABLE 2

Example page area implementation

```
public class PageArea extends java.awt.Component {
...
Object pageToken;
int pages = 1;
int currentPage = ;
Renderer renderer = new HTMLRenderer(this);
...
public void paint(Graphics g) {
...
pageToken = renderer.renderPage(g, currentPage);
...
}
void layout(Rectangle bounds) {
renderer.setPageBounds(bounds);
pages = renderer.getPages();
currentPage = renderer.getPage(pageToken);
repaint();
}
}
```

What is claimed is:

1. A method of presenting information via a user interface of a computer system, the computer system comprising a book component and a renderer component, comprising the steps of:

said book determining page boundaries for pages in which information is to be presented, and communicating said page boundaries to said renderer;

said renderer determining a number of pages, constrained by said page boundaries, required to fully render said information, and communicating said number of pages to said book;

responsive to said book providing an input token representing a prominent element of information on a page, said renderer determining a current page number for the page containing the element of information represented by said token, and communicating said current page number to said book;

responsive to a reflowing event requiring the presentation of a page including the prominent element of information, said book communicating said current page number to said renderer; and said renderer presenting said page including the prominent element of information in a display area, wherein the input token ensures the display of the prominent element after said reflowing event.

2. The method as claimed in 1, further comprising the step of said renderer providing an output token to said book representing a prominent element of information on said presented page.

3. The method as claimed in 1, wherein said page boundaries comprise a page size and any restrictive margins on said page.

4. The method as claimed in claim 1, wherein said display area is determined by said book.

5. The method as claimed in 1, further including the step of replacing said input token with said output token.

6. The method as claimed in claim 1, wherein the reflowing event requiring the presentation of the page is a resizing of the display area.

7. The method as claimed in claim 1, wherein the reflowing event requiring the presentation of the page is a change in margins of the display area.

8. A renderer component for a computer system for use in presenting information via a user interface of a computer system, said component comprising:

means adapted to receive page boundaries from a book component;

means responsive to said book component to provide a number of pages required to display said information according to said page boundaries;

means responsive to said book component providing an input token representing a prominent element of information on a page to determine a current page number for the page containing the element of information represented by said token; and means responsive to said book providing the current page number to present said page containing the prominent element of information in a display area and provide an output token to said book, wherein the input token ensures the display of the prominent element after a reflowing event.

9. A computer program product comprising computer readable program code stored on a computer readable recording medium, the program code comprising a renderer component for use in presenting information via a user interface of a computer system, said renderer component comprising:

means adapted to receive page boundaries from a book component;

means responsive to said book component to provide a number of pages required to display said information according to said page boundaries;

means responsive to said book component providing an input token representing a prominent element of information on a page to determine a current page number for the page containing the element of information represented by said token; and means responsive to said book providing the current page number to present said page containing the prominent element of information in a display area and provide an output token to said book, wherein the input token ensures the display of the prominent element after a reflowing event.

* * * * *